(12) United States Patent
Kwon et al.

(10) Patent No.: US 9,308,968 B2
(45) Date of Patent: Apr. 12, 2016

(54) LEG TYPE TRAVELING APPARATUS

(71) Applicant: Daegu Gyeongbuk Institute of Science and Technology, Daegu (KR)

(72) Inventors: Oh Seok Kwon, Daegu (KR); Rock Hyun Choi, Daegu (KR); Sung Mok Ha, Gyeongsangnam-do (KR); Youn Ho Choi, Daegu (KR); Jung Eun Joung, Gyeongsangbuk-do (KR); Dong Ha Lee, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 14/537,491

(22) Filed: Nov. 10, 2014

(65) Prior Publication Data

US 2015/0183490 A1    Jul. 2, 2015

(30) Foreign Application Priority Data

Dec. 26, 2013  (KR) .......................... 10-2013-0163657
Dec. 26, 2013  (KR) .......................... 10-2013-0163658

(51) Int. Cl.
*B62M 29/02* (2006.01)
*B62M 6/65* (2010.01)

(52) U.S. Cl.
CPC . *B62M 29/02* (2013.01); *B62M 6/65* (2013.01)

(58) Field of Classification Search
CPC ................................ B62M 29/02; B62M 6/50
USPC ..................................... 180/8.7; 280/5.2, 5.26
See application file for complete search history.

(56) References Cited

U.S. PATENT DOCUMENTS

| | | | | |
|---|---|---|---|---|
| 647,245 A * | 4/1900 | Anderson | ................. | B60B 5/02 |
| | | | | 152/55 |
| 1,144,373 A * | 6/1915 | Morton | .................. | B60B 15/18 |
| | | | | 180/7.1 |
| 1,263,726 A * | 4/1918 | Altgelt | ................... | B62D 57/00 |
| | | | | 180/8.7 |
| 2,664,962 A * | 1/1954 | Faszczuk | ............... | B62M 27/02 |
| | | | | 180/195 |
| 3,411,599 A * | 11/1968 | Kahlmorgan | ........... | A47L 11/10 |
| | | | | 180/53.1 |
| 3,529,479 A * | 9/1970 | Ryan | ...................... | A63H 17/12 |
| | | | | 180/8.2 |
| 4,061,199 A * | 12/1977 | Last | ....................... | A61G 5/061 |
| | | | | 180/8.2 |
| 4,200,161 A | 4/1980 | Penington, Jr. | | |
| 4,387,891 A * | 6/1983 | Knochel | .................. | A61H 3/00 |
| | | | | 135/67 |
| 5,798,702 A * | 8/1998 | Okamoto et al. | ........ | B62M 6/45 |
| | | | | 180/220 |
| 6,131,683 A * | 10/2000 | Wada | ....................... | B62M 6/55 |
| | | | | 180/216 |
| 6,302,230 B1 | 10/2001 | Kamen et al. | | |
| 6,402,161 B1 * | 6/2002 | Baghdadi | ................ | B62B 5/026 |
| | | | | 180/8.2 |

(Continued)

FOREIGN PATENT DOCUMENTS

| | | |
|---|---|---|
| EP | 1298041 A | 4/2003 |
| JP | 2008-062769 A | 3/2008 |
| KR | 10-2006-0059235 A | 6/2006 |

*Primary Examiner* — Joseph Rocca
*Assistant Examiner* — Michael Stabley
(74) *Attorney, Agent, or Firm* — Novick, Kim & Lee, PLLC; Jae Youn Kim (57) ABSTRACT

Provided is a leg type traveling apparatus including a bicycle frame, a travel module including a leg type front traveling unit rotatably mounted to a front of the bicycle frame and a leg type rear traveling unit rotatably mounted to a rear of the bicycle frame, a drive unit to drive the travel module, and a control unit to control the drive unit, in which the control unit includes a pedal detector to detect a rotating speed of a pedal rotatably mounted to the bicycle frame and a controller to control a driving speed of the drive unit based on detection information provided by the pedal detector.

7 Claims, 12 Drawing Sheets

(56) References Cited

U.S. PATENT DOCUMENTS

| | | |
|---|---|---|
| 6,964,309 B2 | 11/2005 | Quinn et al. |
| D540,503 S * | 4/2007 | Tsang .............................. D34/28 |
| 7,249,640 B2 | 7/2007 | Horchler et al. |
| 7,380,618 B2 * | 6/2008 | Gunderson ........ B62D 49/0635 180/7.1 |
| 7,503,567 B2 * | 3/2009 | Frankie .................... A61G 5/04 180/8.2 |
| 7,806,208 B2 * | 10/2010 | Gunderson ........ B62D 49/0635 180/7.1 |
| 2005/0087940 A1 * | 4/2005 | Ally ........................ B62B 5/026 280/5.26 |
| 2007/0252452 A1 * | 11/2007 | Ishimoto .................... B62J 6/12 310/67 A |
| 2012/0241264 A1 * | 9/2012 | Hosaka ..................... B60L 7/14 188/156 |
| 2014/0062351 A1 * | 3/2014 | Spelta ................ B60L 11/1801 318/139 |

\* cited by examiner

LEG TYPE TRAVELING APPARATUS

CROSS-REFERENCE TO RELATED APPLICATION

This application claims the priority benefit of Korean Patent Application No. 10-2013-0163657, filed on Dec. 26, 2013, and Korean Patent Application No. 10-2013-0163658, filed on Dec. 26, 2013, in the Korean Intellectual Property Office, the disclosures of which are incorporated herein by reference.

BACKGROUND

1. Field of the Invention

The present invention relates to a leg type traveling apparatus, and more particularly, to a leg type traveling apparatus in which a travel module is provided in a type of a leg to allow the leg type traveling apparatus to readily travel despite an obstacle such as a flight of stairs.

2. Description of the Related Art

There are a number of traveling apparatuses driven by rotation of a wheel. For example, a bicycle and a Segway to which a rotatable wheel is mounted may travel in response to an operation of a pedal and a handlebar. Use of the bicycle has been constant due to a high mobility and a simple operation and also because riding the bicycle may provide a rider of the bicycle with a large amount of exercise and be effective in health maintenance.

In general, the bicycle may include a bicycle frame to which a handlebar is mounted for a steering operation, wheels rotatably mounted to a front and a rear side of the bicycle frame, pedals, a chain connecting the pedals and the wheels to deliver a rotation of the pedals to the wheels, and a brake to halt a rotation of the wheels by operating a lever mounted to the handlebar.

However, such a general type bicycle may travel only on a flat ground due to a structure of the wheels despite the high mobility. For example, when the bicycle encounters stairs during use, a rider of the bicycle may need to take a detour or ascend the stairs while carrying the bicycle.

The Segway is ridden by a single person standing thereon and driven by a drive unit such as an electric battery. Recently, use of such a vehicle has been increasing. The Segway may have one or two wheels, and determine a traveling direction and speed by measuring a change in a center of gravity of a rider in an interval.

The Segway is designed in order for the rider not to fall based on a balancing mechanism. Thus, the Segway may travel forward or backward when the rider simply leans forward or backward, and automatically change a traveling direction when the rider simply leans leftward or rightward. The Segway may halt travel in such a way and thus, a brake may not be required.

However, such a conventional Segway may apply a wheel driving method and thus, may not be able to traverse stairs inclined at a certain height. Accordingly, there is a desire for development of a traveling apparatus of a new structure that may allow the traveling apparatus to readily traverse steep areas, such as, stairs.

SUMMARY

An aspect of the present invention provides a leg type traveling apparatus in which a travel module is provided in a type of a leg in lieu of a wheel structure to enable the leg type traveling apparatus to readily travel despite an obstacle such as a flight of stairs.

Another aspect of the present invention provides a bicycle-shaped leg type traveling apparatus in which a drive unit provides driving power for a rotation of a travel module to relieve exhaustion of a physical strength of a rider and increase convenience for the rider.

Still another aspect of the present invention provides a Segway-shaped leg type traveling apparatus in which a control unit controls a drive unit based on detection information provided by a detection unit to enable a rider to readily operate the Segway-shaped leg type traveling apparatus during travel.

According to an aspect of the present invention, there is provided a bicycle-shaped leg type traveling apparatus including a bicycle frame, a travel module including a leg type front traveling unit rotatably mounted to a front of the bicycle frame and a leg type rear traveling unit rotatably mounted to a rear of the bicycle frame, a drive unit to drive the travel module, and a control unit to control the drive unit. The control unit may include a pedal detector to detect a rotating speed of a pedal rotatably mounted to the bicycle frame, and a controller to control a driving speed of the drive unit based on detection information provided by the pedal detector. The bicycle-shaped leg type traveling apparatus may readily travel despite an obstacle such as a flight of stairs because the travel module is provided in a type of a leg in lieu of a wheel structure.

Each of the leg type front traveling unit and the leg type rear traveling unit may include a shaft mounted to the bicycle frame, a leg unit rotatably connected to the shaft and including a plurality of leg members enabling travel by stepping on a ground and pushing off the ground during rotation, and a brake mounted to the shaft to halt the rotation of the leg unit.

The control unit may further include a lever detector to detect an operation of a brake lever mounted to the bicycle frame and deliver detection information obtained by the detecting to the control unit. When a rider pulls the brake lever, the controller may activate the brake or halt an operation of the drive unit to halt an operation of the travel module.

The leg unit may be provided as a pair of leg units separated along a longitudinal direction of the shaft, and the leg members of each of the leg units may be disposed at equidistant intervals along a circular direction of the shaft.

Each of the leg members may include an articular portion including a plurality of joints, and an elastic portion to connect the joints and allow one joint to be transformed with respect to another joint.

The leg member may further include a nonskid pad mounted to an end portion of the articular portion to prevent skidding when in contact with the ground.

The elastic portion may be provided in a type of a spring or a torsion spring.

The drive unit may be mounted to each of the pair of the leg units and include drive motors to be selectively driven under a control of the control unit.

According to another aspect of the present invention, there is provided a Segway-shaped leg type traveling apparatus including an embarkation body on which a user embarks, and a leg type traveling unit rotatably mounted to the embarkation body. The leg type traveling unit may include a shaft mounted to the embarkation body, and a leg unit rotatably connected to the shaft and including a plurality of leg members enabling travel by stepping on a ground and pushing off the ground during rotation. The Segway-shaped leg type traveling apparatus may readily travel despite an obstacle such as flight of stairs because the leg type traveling unit is provided in a type of a leg in lieu of a wheel structure.

The leg unit may be provided as a pair of leg units separated along a longitudinal direction of the shaft, and the leg members of each of the leg units may be disposed at equidistant intervals along a circular direction of the shaft.

Each of the leg units provided as the pair may include three or four leg members, and initial positions of the leg members from the shaft may be set to allow leg members of one leg unit to be alternately disposed with leg members of another leg unit at equidistant intervals.

Each of the leg members may include an articular portion including a plurality of joints, and an elastic portion to connect the joints and allow one joint to be transformed with respect to another joint.

The leg member may further include a nonskid pad mounted to an end portion of the articular portion to prevent skidding when in contact with the ground.

The Segway-shaped leg type traveling apparatus may further include a drive unit to drive the leg type traveling unit, a detection unit to detect a tilt of the embarkation body, and a control unit to selectively control an operation of the drive unit based on detection information provided by the detection unit.

The detection unit may include a traveling direction tilt sensor to detect a tilt in a front and rear direction of the embarkation body, and an orthogonal traveling direction tilt sensor to detect a tilt in a left and right direction of the embarkation body.

The drive unit may include a pair of drive motors respectively mounted to the pair of the leg units. When a forward tilt or a backward tilt is detected by the traveling direction tilt sensor, the pair of the drive motors may be identically driven. When a leftward tilt or a rightward tilt is detected by the orthogonal traveling direction tilt sensor, the pair of the drive motors may be differently driven based on a desired steering direction.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

Figure 1:
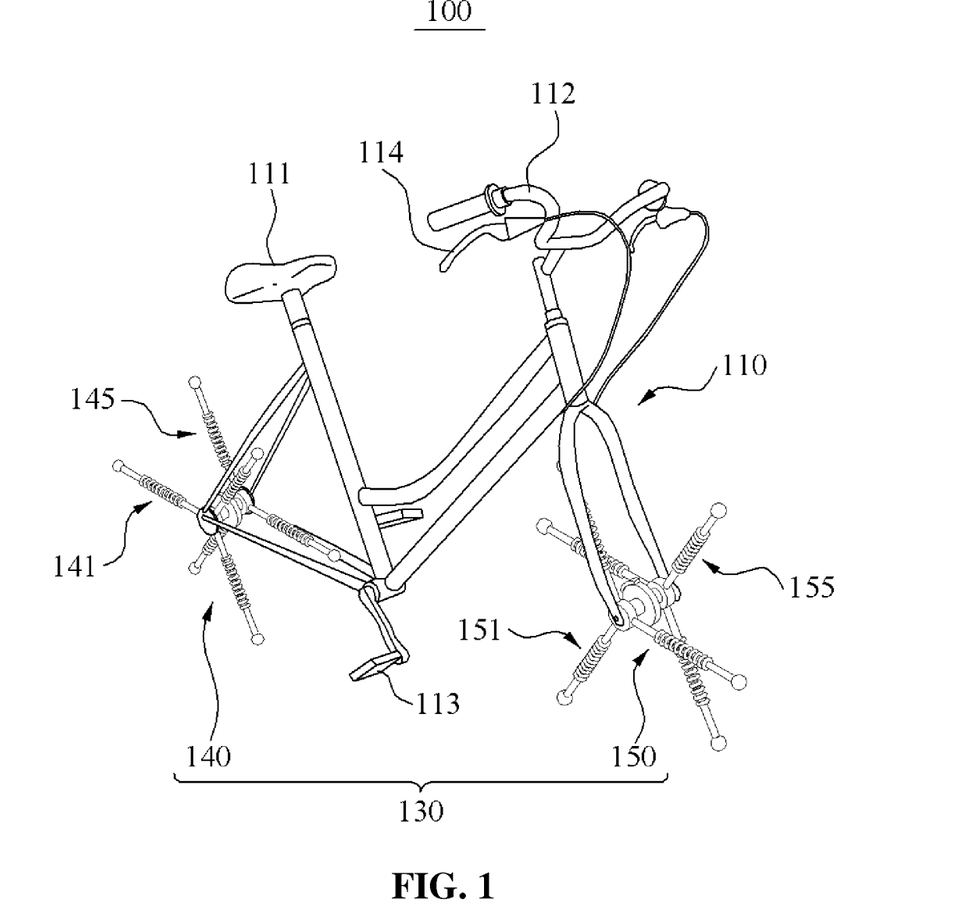
FIG. 1 is a perspective view illustrating an example of a bicycle-shaped leg type traveling apparatus according to an embodiment of the present invention.
Figure 2:
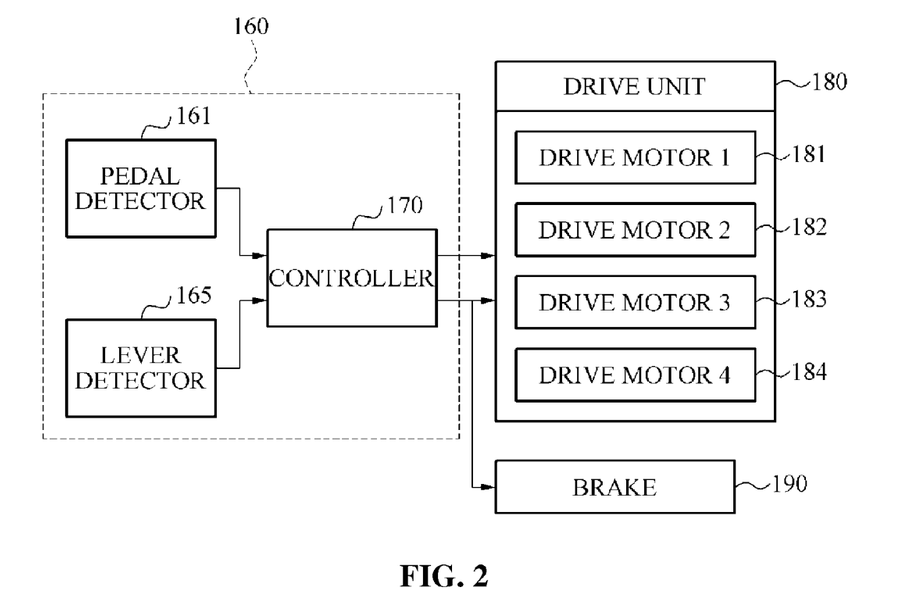
FIG. 2 is a block diagram illustrating the control unit controlling the bicycle-shaped leg type traveling apparatus illustrated in FIG. 1.
Figure 3:
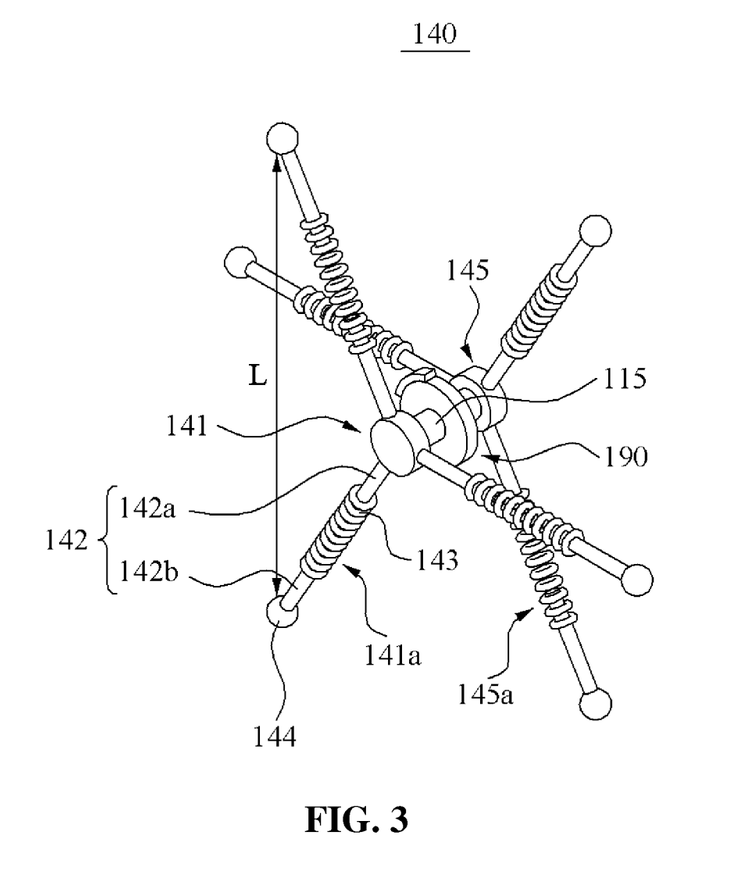
FIG. 3 is a perspective view illustrating the leg type rear traveling unit of the travel module illustrated in FIG. 1.

FIG. 1 is a perspective view illustrating an example of a bicycle-shaped leg type traveling apparatus 100 according to an embodiment of the present invention. FIG. 2 is a block diagram illustrating a control unit 160 controlling the bicycle-shaped leg type traveling apparatus 100 illustrated in FIG. 1. FIG. 3 is a perspective view illustrating a leg type rear traveling unit 140 of a travel module 130 illustrated in FIG. 1.

The bicycle-shaped leg type traveling apparatus 100 includes a bicycle frame 110, the travel module 130 including a leg type front traveling unit 150 and the leg type rear traveling unit 140 mounted in a front and a rear of the bicycle frame 110, a drive unit 180 to drive the travel module 130, and a control unit 160 to control the drive unit 180 as intended by a rider.

The bicycle-shaped leg type traveling apparatus 100 of such a configuration includes the travel module 130 provided in a type of a leg in lieu of a wheel and thus, may travel in an inclined place and a steep location such as stairs in addition to a flat area. Thus, mobility of and convenience for the rider may increase.

Referring to FIG. 1, the bicycle frame 110 includes a saddle 111 on which the rider embarks, a handlebar 112 for steering, and a pedal 113. The rider may travel to a desired destination by operating the handlebar 112 and turning the pedal 113 while sitting on the saddle 111.

Referring to FIG. 2, the bicycle-shaped leg type traveling apparatus 100 includes the drive unit 180 to drive the travel module 130 and the control unit 160 to control the drive unit 180. The drive unit 180 includes a total of four drive motors, for example, drive motor 1 181, drive motor 2 182, drive motor 3 183, and drive motor 4 184, and drives a pair of leg units 141 and 145 mounted to the leg type rear traveling unit 140 and a pair of leg units 151 and 155 mounted to the leg type front traveling unit 150. A further description will be provided hereinafter.

The travel module 130 includes the leg type front traveling unit 150 and the leg type rear traveling unit 140 which have a practically identical configuration. Thus, the description to be provided hereinafter will focus on the leg type rear traveling unit 140, and only a brief description of the leg type front traveling unit 150 will be provided as necessary or omitted.

As illustrated in FIGS. 1 and 3, the leg type rear traveling unit 140 of the travel module 130 includes a shaft 115 disposed to cross a space of the bicycle frame 110, the pair of the leg units 141 and 145 rotatably connected to the shaft 115, and a brake 190 mounted to the shaft 115 to halt rotation of the leg units 141 and 145. The leg units 141 and 145 may be driven by the drive motor 1 181 and the drive motor 2 182, respectively, to drive each of the leg units 141 and 145.

The leg units 141 and 145 may rotate in one direction or another by driving power provided by the drive motor 1 181 and the drive motor 2 182, and a rotating speed of the leg units 141 and 145 may be controlled.

Referring to FIG. 3, each of the leg units 141 and 145 includes three leg members, for example, 141a and 145a, which are formed along a circular direction of the shaft 115. The respective three leg members including 141a and 145a are disposed at equidistant intervals of 120°. Thus, the leg members including 141a and 145a may enable the bicycle-shaped leg type traveling apparatus 100 to stably travel by stepping on a ground or pushing off the ground during rotation. However, the number of the leg members may not be limited to three as illustrated in FIGS. 1 and 3, it is obvious that four leg members may be disposed at intervals of 90°.

Each of the leg members including 141a and 145a includes an articular portion, for example, 142. As illustrated in FIG. 3, one leg member 141a includes two joints including a first joint 142a and a second joint 142b. The first joint 142a is connected to the second joint 142b through an elastic portion 143 provided in a type of a spring having elasticity.

Thus, when each of the leg members including 141a and 145a steps on the ground, elastic energy may be stored by compression of the elastic portion 143, and the stored energy may be used as a driving force again. Accordingly, a traveling efficiency may be improved. In addition, the first joint 142a is connected to the second joint 142b through the elastic portion 143 and thus, a position of the second joint 142b with respect to the first joint 142a may be corrected. Accordingly, a traveling stability may be improved.

In addition, a nonskid pad 144 is provided on an end portion of the second joint 142b to prevent skidding when in contact with the ground. The nonskid pad 144 may be provided using a material such as rubber. Although the nonskid pad 144 is illustrated as a round shape in FIG. 3, it is obvious that the nonskid pad 144 may be provided in a plate shape to improve stability when in contact with the ground.

Referring to FIG. 3, a height of a traversable obstacle or a torque may be determined based on a distance (L) between end portions of the leg members including 141a and 145a. For example, when the distance (L) between the end portions increases, a higher obstacle may be traversable. However, lengths of the leg members may increase and thus, a driving torque to be provided by the drive unit 180 may increase.

The bicycle-shaped leg type traveling apparatus 100 may travel when the rider rotates the pedal 113. Here, an operation method different from a conventional operation method through which a rotating force of a pedal is delivered to a wheel through a chain may be applied. According to an embodiment, the travel module 130 may operate under the control of the control unit 160.

Referring back to FIG. 2, the control unit 160 includes a pedal detector 161 to detect a rotating speed of the pedal 113 rotatably mounted to the bicycle frame 110, a lever detector 165 to detect an operation of a brake lever 114 mounted to the handlebar 112, and a controller 170 to control a driving speed of the drive unit 180 or determine whether to halt the drive unit 180 based on detection information obtained by the detecting performed by the pedal detector 161 or the lever detector 165.

The pedal detector 161 may be provided as an encoder, but is not limited thereto.

For example, when the rotating speed of the pedal 113 increases, the pedal detector 161 may detect information on the increase in real time and deliver the information to the controller 170. The controller 170 may then increase a traveling speed by driving each of the drive motors 181 through 184 of the drive unit 180 at a speed corresponding to the increased rotating speed of the pedal 113. Conversely, when the rotating speed of the pedal 113 decreases, the pedal detector 161 may detect information on the decrease in real time and deliver the information to the controller 170. The controller 170 may then decrease the traveling speed by decreasing a rotating speed of each of the drive motors 181 through 184 of the drive unit 180 to a speed corresponding to the decreased rotating speed of the pedal 113.

When the rider pulls the brake lever 114, the lever detector 165 may detect whether the brake lever 114 is in operation and deliver detection information to the controller 170. The controller 170 may then halt travel of the bicycle-shaped leg type apparatus 100 by applying one of the following two methods. Alternatively, the controller 170 may halt the travel of the bicycle-shaped leg type traveling apparatus 100 through a combination the two methods.

First, when the lever detector 165 detects that the brake lever 114 is pulled, the controller 170 may halt an operation of each of the drive motors 181 through 184 of the drive unit 180 based on the detection information and halt the travel of the bicycle-shaped leg type traveling apparatus 100.

Second, when the lever detector 165 detects that the brake lever 114 is pulled, the controller 170 may lock the brake 190 mounted to the shaft 115 based on the detection information and halt the travel of the bicycle-shaped leg type traveling apparatus 100.

As described in the foregoing, the traveling speed of the bicycle-shaped leg type traveling apparatus 100 may be selectively adjusted under the control of the control unit 160, and also the halt operation may be accurately performed. Although an operation of rotating the pedal 113 is performed, the operation of rotating the pedal 113 may apply the foregoing method different from the conventional method through which power is delivered through the chain. Thus, the bicycle-shaped leg type traveling apparatus 100 may relieve exhaustion of a physical strength of the rider and improve the convenience for the rider.

A principle of controlling the drive unit 180 by the controller 170 will be described hereinafter with respect to FIGS. 4A through 4C.

Figure 4A:
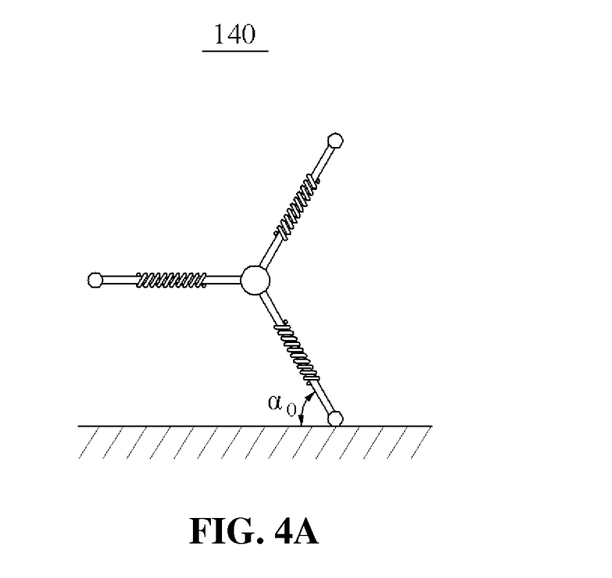
FIGS. 4A through 4C are diagrams illustrating examples of a rotating operation of a leg type traveling unit under a control of a control unit according to an embodiment of the present invention.
Figure 4B:
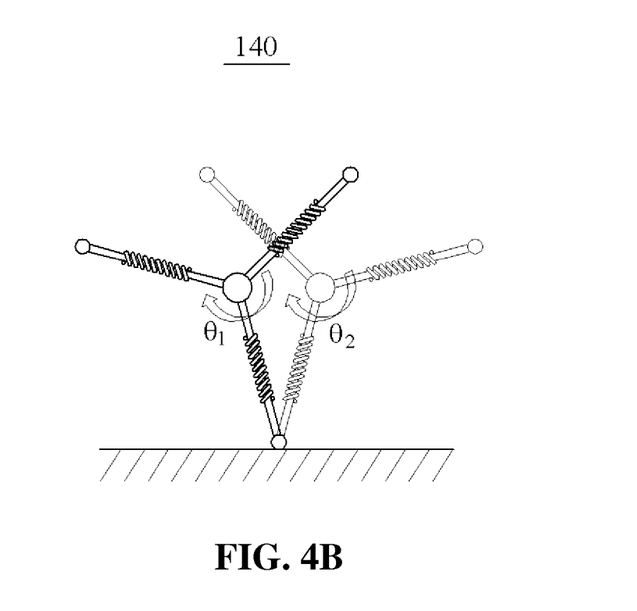
Figure 4C:
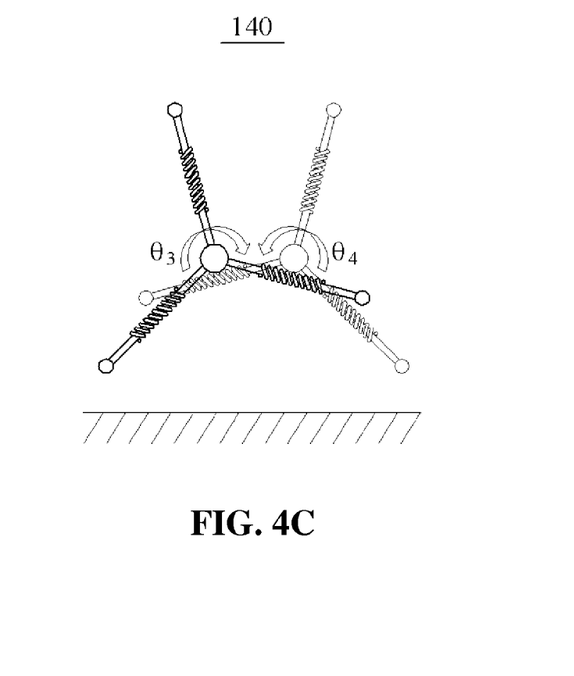

FIGS. 4A through 4C are diagrams illustrating examples of a rotating operation of the leg type rear traveling unit 140 under a control of the controller 170.

The controller 170 may control an angle formed by each of the leg units 141 and 145 against the ground when each of the leg units 141 and 45 steps on the ground under a control of the drive motors 181 and 182 mounted respectively to the leg units 141 and 145 based on a rotating speed of the pedal 113. The controller 170 may also control a rotating speed when each of the leg units 141 and 145 steps on the ground, a rotating speed when each of the leg units 141 and 145 are separated from the ground, and a rotating speed in each rotating section. The controller 170 may control the angle "$\alpha_0$" formed by each of the leg units 141 and 145 against the ground when each of the leg units 141 and 45 steps on the ground, and control a rotating speed, for example, $\ominus 1$, $\ominus 2$, $\ominus 3$ and $\ominus 4$ of each of the leg units 141 and 145.

The controller 170 may control the angle $\alpha_0$ and the rotating speed $\ominus 1$, $\ominus 2$, $\ominus 3$ and $\ominus 4$ of each of the leg units 141 and 145 in accordance with a traveling speed commanded by the controller 170 based on the rotating speed of the pedal 113. For example, when the commanded traveling speed is low, the controller 170 may control the angle $\alpha_0$ to be higher and the rotating speed $\ominus 1$, $\ominus 2$, $\ominus 3$ and $\ominus 4$ to be lower. Conversely, when the commanded traveling speed is high, the controller 170 may control the angle $\alpha_0$ to be lower and the rotating speed $\ominus 1$, $\ominus 2$, $\ominus 3$ and $\ominus 4$ to be higher.

The bicycle-shaped leg type traveling apparatus 100 may travel forward by controlling the drive motors 181 and 182 of the leg units 141 and 145 by the controller 170 to allow one leg unit 141 and another leg unit 145 having an initial leg angle difference of 60° therebetween to apply the angle $\alpha_0$ and the rotating speed $\ominus 1$, $\ominus 2$, $\ominus 3$ and $\ominus 4$ determined in accordance with the travelling speed commanded by the controller 170 based on the rotating speed of the pedal 113.

The bicycle-shaped leg type traveling apparatus 100 may control a leg angle difference between two leg units 151 and 155 of the leg type front traveling unit 150 and a leg angle difference between the two leg units 141 and 145 of the leg type rear traveling unit 140. For ease of description, the two leg units 151 and 155 of the leg type front travelling unit 150 will be referred to as a first leg unit 155 and a second leg unit 151, respectively. Similarly, the two leg units 141 and 145 of the leg type rear traveling unit 140 will be referred to as a third leg unit 145 and a fourth leg unit 141, respectively.

Figure 5A:
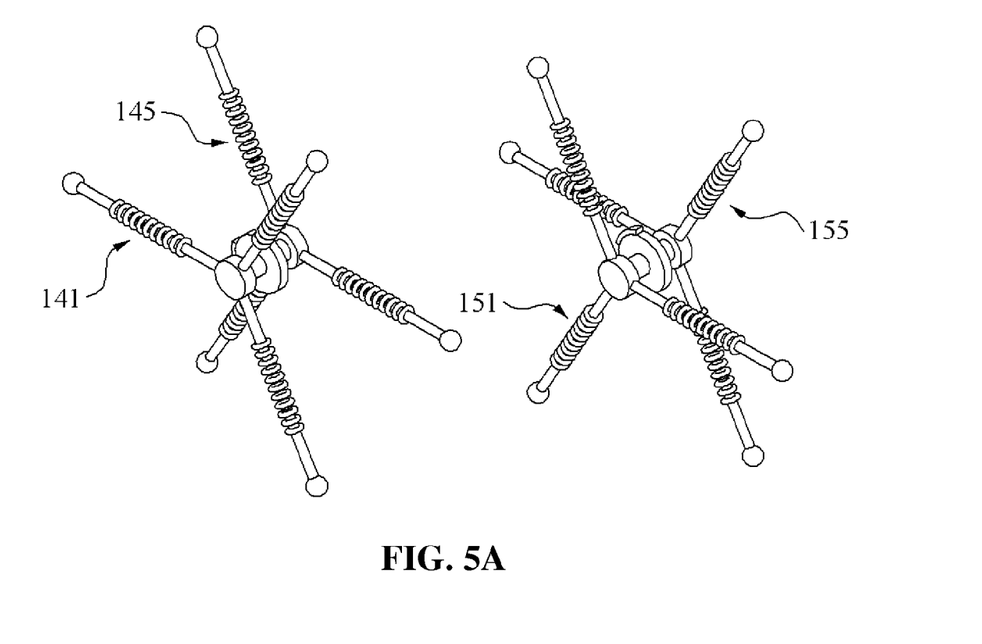
FIGS. 5A through 5C are diagrams illustrating examples of control on the leg units of the leg type front traveling unit and the leg type rear traveling unit illustrated in FIG. 1.
Figure 5B:
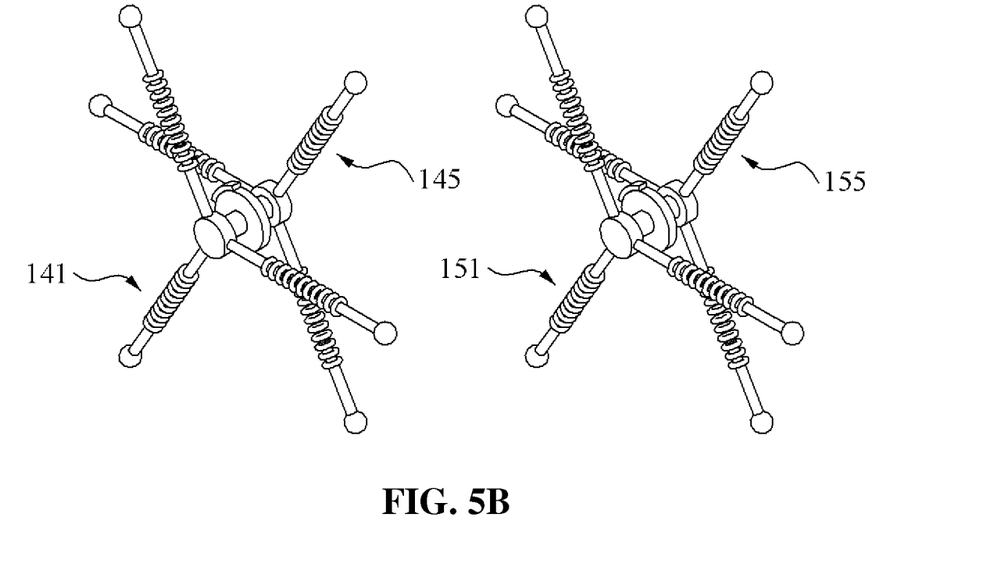
Figure 5C:
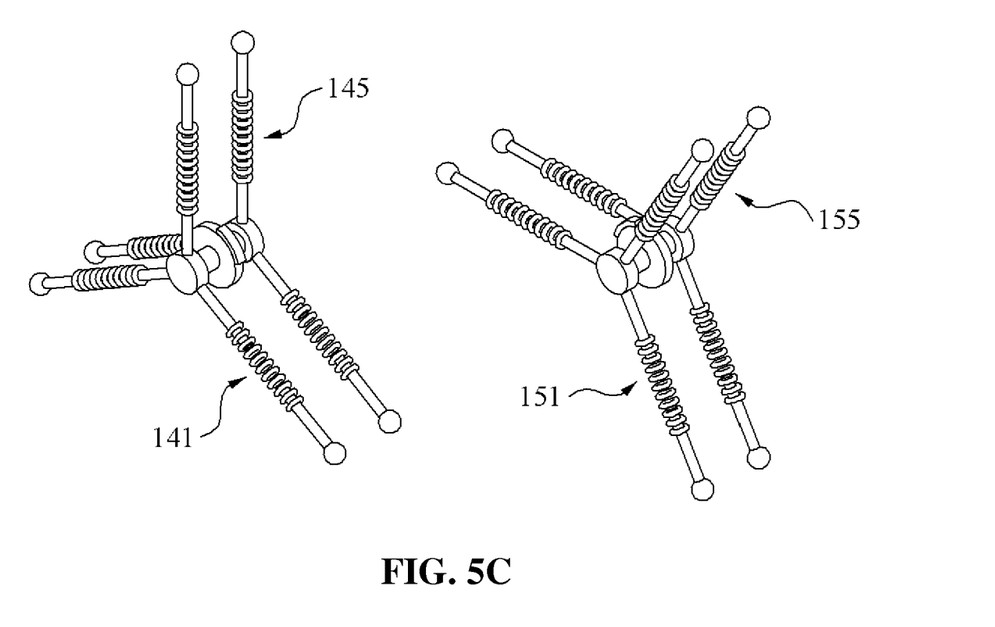

FIGS. 5A through 5C are diagrams illustrating examples of control on the leg units of the leg type front traveling unit 150 and the leg type rear traveling unit 140 illustrated in FIG. 1.

As illustrated in FIG. 5A, the first leg unit 155 and the fourth leg unit 141 may be controlled to have an identical angle, and the second leg unit 151 and the third leg unit 145 may be controlled to have an identical angle. However, the first leg unit 155 and the second leg unit 151 may be controlled to have different angles.

Alternatively, as illustrated in FIG. 5B, the first leg unit 155 and the third leg unit 145 may be controlled to have an identical angle, and the second leg unit 151 and the fourth leg unit 141 may be controlled to have an identical angle. However, the first leg unit 155 and the second leg unit 151 may be controlled to have different angles.

Alternatively, as illustrated in FIG. 5C, the first leg unit 155 and the second leg unit 151 may be controlled to have an identical angle, and the third leg unit 145 and the fourth leg unit 141 may be controlled to have an identical angle. However, the first leg unit 155 and the third leg unit 145 may be controlled to have different angles.

Each of the drive motors 181 through 184 included in each of the leg units 141, 145, 151, and 155 may individually operate, and the controller 170 may drive each drive motor to control each angle of the leg units 141, 145, 151, and 155. Thus, the controller 170 may suitably control the leg angles for a required situation and accordingly, optimal travel may be achieved.

As described in the foregoing, the travel module 130 is provided in a type of a leg in lieu of a wheel structure and thus, the bicycle-shaped leg type traveling apparatus 100 may readily travel over an obstacle such as a flight of stairs. In addition, the drive unit 180 provides driving power for rotation of the travel module 130 and thus, the bicycle-shaped leg type traveling apparatus 100 may relieve exhaustion of a physical strength of a rider.

Hereinafter, examples of modifications to a leg type travelling unit of the bicycle-shaped leg type travelling apparatus 100 will be introduced.

Figure 6:
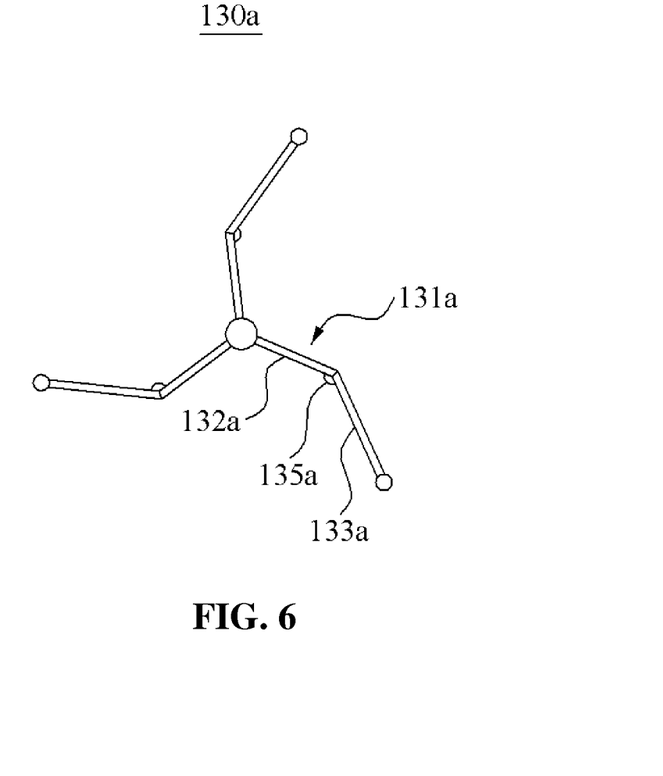
FIG. 6 is a schematic view illustrating an example of a configuration of a leg type traveling unit of a bicycle-shaped leg type traveling apparatus according to an embodiment of the present invention.

FIG. 6 is a schematic view illustrating an example of a configuration of a leg type traveling unit 130a of the bicycle-shaped leg type traveling apparatus 100 according to embodiment of the present invention.

Referring to FIG. 6, one leg member 131a of the leg type traveling unit 130a of the bicycle-shaped leg type apparatus 100 applies a torsion spring 135a as an elastic portion. One joint 132a is connected to another joint 133a through the torsion spring 135a and thus, a traveling flexibility may be achieved. In addition, propulsion may be achieved when the traveling unit 130a steps on a ground or travels. In detail, when the leg member 131a steps on the ground, elastic energy may be stored by compression of the torsion spring 135a and the stored energy may be used as the propulsion again. Thus, a traveling efficiency may be improved.

Figure 7:
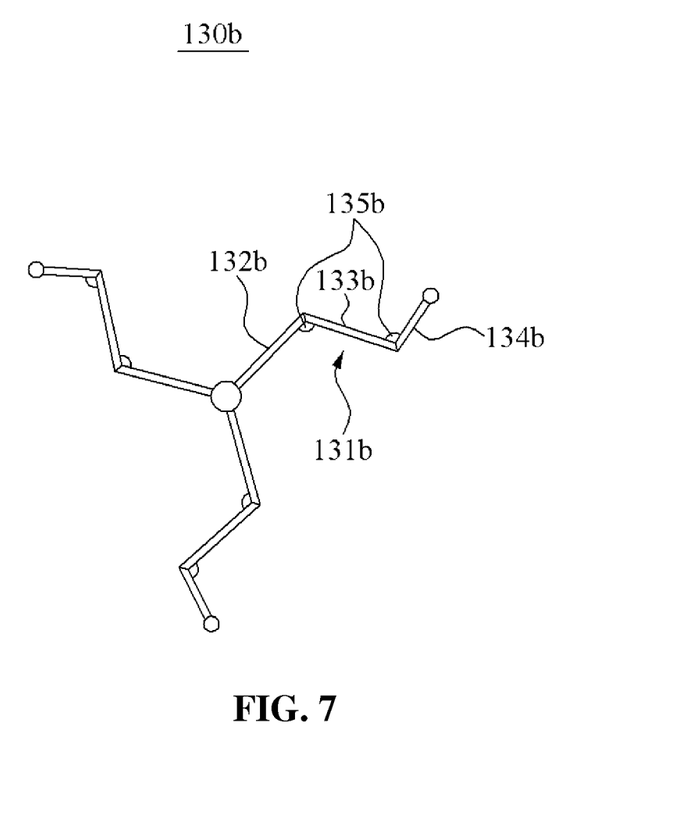
FIG. 7 is a schematic view illustrating another example of a configuration of a leg type traveling unit of a bicycle-shaped leg type traveling apparatus according to an embodiment of the present invention.

FIG. 7 is a schematic view illustrating another example of a configuration of a leg type traveling unit 130b of the bicycle-shaped leg type traveling apparatus 100 according to embodiment of the present invention.

Referring to FIG. 7, one leg member 131b the leg type traveling unit 130b of the bicycle-shaped leg type traveling apparatus 100 includes three joints, for example, 132b, 133b, and 134b. Torsion springs 135b are included among the joints 132b, 133b, and 134b. The torsion springs 135b are crossly disposed in the leg member 131b and thus, each of the joints 132b, 133b, and 134b may perform various movements.

Hereinafter, a configuration of a Segway-shaped leg type traveling apparatus will be described. However, descriptions of components practically identical to the components of the bicycle-shaped leg type traveling apparatus 100 will be omitted here for brevity.

Figure 8:
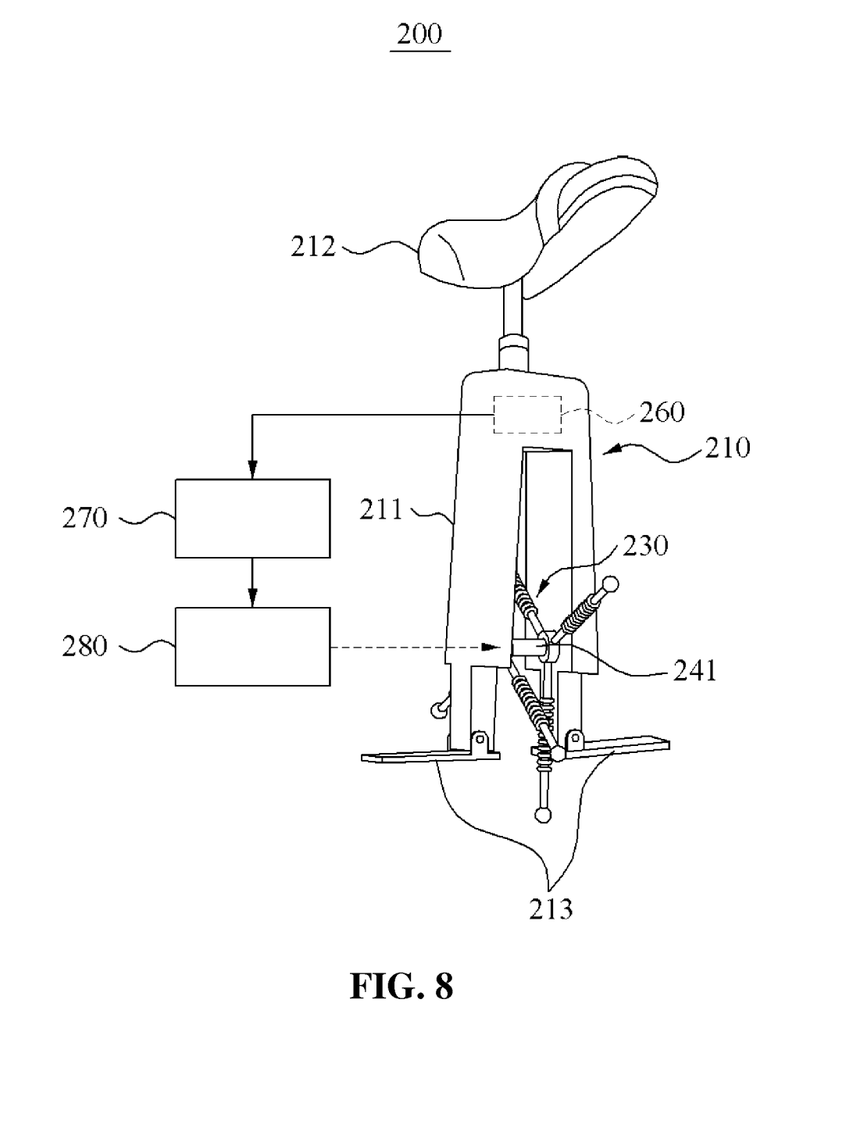
FIG. 8 is a perspective view illustrating an example of a Segway-shaped leg type traveling apparatus according to another embodiment of the present invention.
Figure 9:
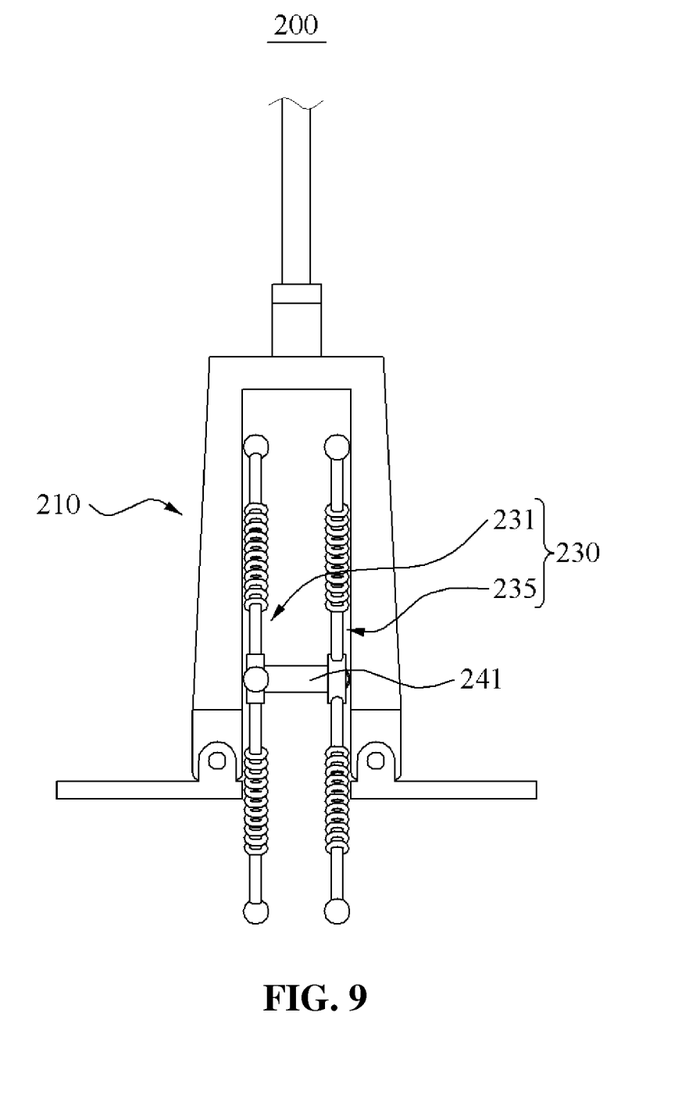
FIG. 9 is a front view illustrating the Segway-shaped leg type traveling apparatus illustrated in FIG. 8.
Figure 10:
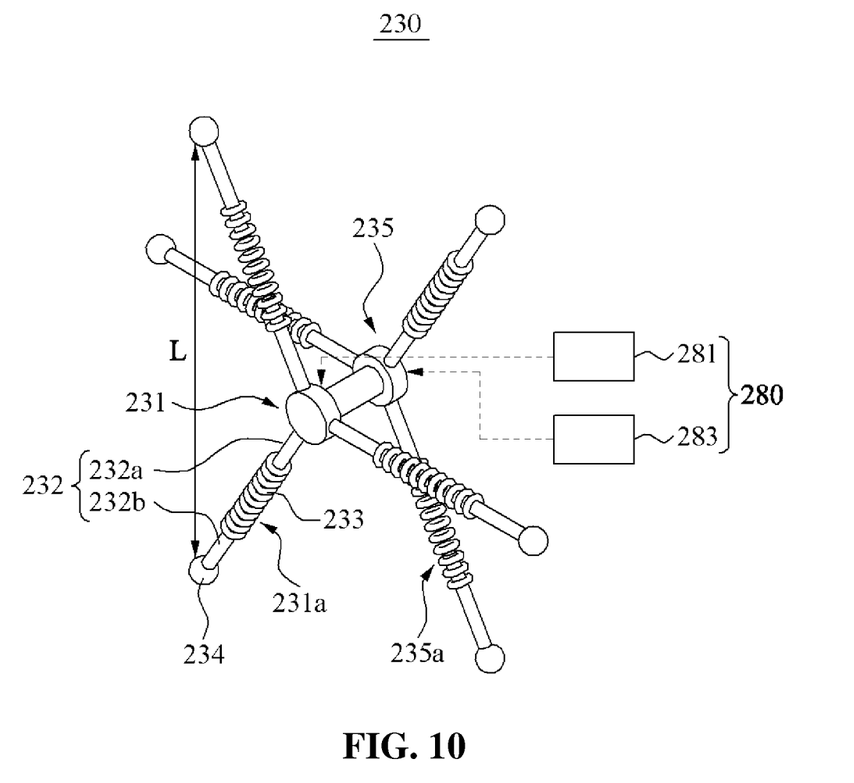
FIG. 10 is a perspective view illustrating the leg type traveling unit illustrated in FIGS. 8 and 9.
Figure 11:
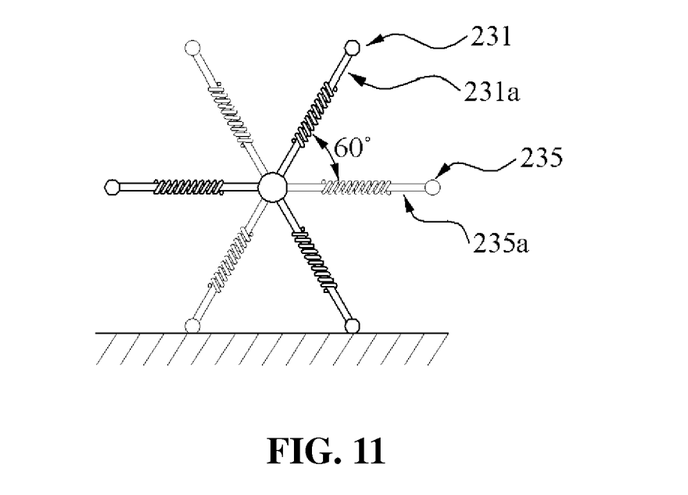
FIG. 11 is a schematic view illustrating an initial posture of the leg type traveling unit of the Segway-shaped leg type traveling apparatus illustrated in FIG. 8.
Figure 12:
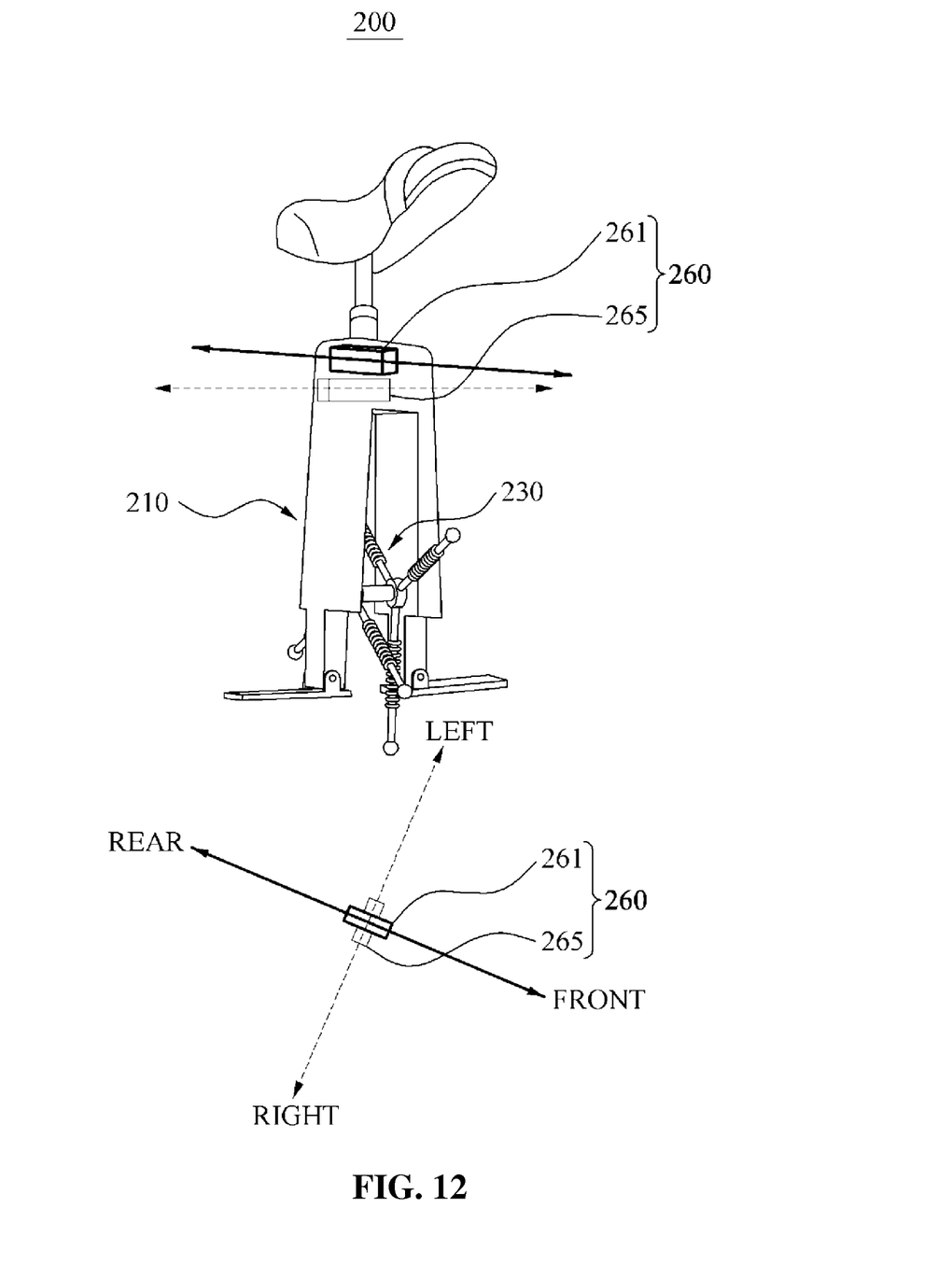
FIG. 12 is a diagram illustrating an operation principle of the detection unit mounted to the Segway-shaped leg type traveling apparatus illustrated in FIG. 8.

FIG. 8 is a perspective view illustrating an example of a Segway-shaped leg type traveling apparatus 200 according to another embodiment of the present invention. FIG. 9 is a front view illustrating the Segway-shaped leg type traveling apparatus 200 illustrated in FIG. 8. FIG. 10 is a perspective view illustrating a leg type traveling unit 230 illustrated in FIGS. 8 and 9. FIG. 11 is a schematic view illustrating an initial posture of the leg type traveling unit 230 of the Segway-shaped leg type traveling apparatus 200 illustrated in FIG. 8. FIG. 12 is a diagram illustrating an operation principle of a detection unit 260 mounted to the Segway-shaped leg type traveling apparatus 200 illustrated in FIG. 8.

Referring to FIG. 8, the Segway-shaped leg type traveling apparatus 200 includes an embarkation body 210 on which a user embarks, the leg type traveling unit 230 rotatably mounted to the embarkation body 210, and a drive unit 280 to generate driving power to drive the leg type traveling unit 230.

The Segway-shaped leg type traveling apparatus 200 of such a configuration may travel over an inclined place and an inclined location such as stairs in addition to a flat ground because the leg type traveling unit 230 is provided in a type of a leg in lieu of a wheel. Thus, mobility and convenience for the user may be improved.

As illustrated in FIGS. 8 and 9, the embarkation body 210 includes a frame 211, which is a basic skeleton, a saddle 212 connected to an upper portion of the frame 211 and on which the user is seated, and support members 213 provided at both sides of a lower portion of the frame 211 for the user to step on feet.

In addition, the embarkation body 210 includes a detection unit 260 to detect a tilt of the embarkation body 210 from a ground, and the drive unit 280 to generate the driving power to drive the leg type traveling unit 230. As illustrated in FIG. 10, the drive unit 280 may include a pair of drive motors 281 and 283, and individually drive a pair of leg units 231 and 235 mounted to the leg type traveling unit 230. A further description will be provided hereinafter.

As illustrated in FIGS. 8 through 10, the leg type traveling unit 230 includes a shaft 241 disposed to cross a space of the frame 211 and the pair of the leg units 231 and 235 rotatably connected to the shaft 241. Here, the leg units 231 and 235 may be driven by the respective drive motors 281 and 283 to allow the pair of the leg units 231 and 235 to be individually driven.

The leg units 231 and 235 may rotate in one direction or another by the driving power provided by the respective drive motors 281 and 283, and a rotating speed of the leg units 231 and 235 may be controlled by the drive motors 281 and 283. Since the pair of the leg units 231 and 235 individually rotates, each of the leg units 231 and 235 may steer a traveling direction by changing the rotating speed.

Referring to FIG. 10, each of the leg units 231 and 235 includes three leg members including, for example, 231a and 235a, formed in a circular direction. The three leg members including 231a and 235a may be disposed to have equidistant intervals of 120° to allow the Segway-shaped leg type traveling apparatus 200 to stably travel by stepping on the ground or pushing off the ground during rotation. However, the number of the leg members including 231a and 235a may not be limited to three, and it is obvious that, for example, four leg members may be disposed at intervals of 90°.

Each of the leg members including 231a and 235a includes an articular portion 232. As illustrated in FIG. 10, one leg member 231a includes two joints, for example, a first joint 232a and a second joint 232b. The first joint 232a and the second joint 232b are connected through an elastic portion 233 provided in a type of a spring possessing elasticity.

Thus, when each of the leg members including 231a and 235a steps on the ground, elastic energy may be stored by compression of the elastic portion 233 and the stored energy may be used as a means of propulsion again. Thus, a traveling efficiency may be improved. In addition, the first joint 232a is connected to the second joint 232b through the elastic portion 233 and thus, a position of the second joint 232b with respect to the first joint 232a may be corrected although the ground is winding or uneven. Accordingly, a traveling stability may be improved.

In addition, a nonskid pad 234 is provided on an end portion of the second joint 232b to prevent skidding when in contact with the ground. The nonskid pad 234 may be provided using a material such as rubber. Although the nonskid pad 234 is illustrated as a round shape in FIG. 10, it is obvious that the nonskid pad 234 may be provided in a plate shape to improve stability when in contact with the ground.

Further, a height of a traversable obstacle or a torque may be determined based on a distance (L) between end portions of the leg members including 231a and 235a. For example, when the distance (L) between the end portions increases, a higher obstacle may be traversable. However, lengths of the leg members including 231a and 235a may increase and thus, a driving torque to be provided by the drive unit 280 may increase.

Referring to FIG. 11, the pair of the leg units 231 and 235 is disposed to allow the leg members including 231a and 235a to be alternately disposed.

One leg member 231a of one leg unit 231 may be alternately disposed at an equidistant interval of 60° with respect to another leg member 235a of another leg unit 235. For example, when the Segway-shaped leg type traveling apparatus 200 travels on a flat ground, the leg member 231a of the leg unit 231 may step on the ground at a different position from the leg member 235a of the leg unit 235 and thus, reaction may be applied onto a contact point on the ground and propulsion may be applied toward a traveling direction.

A traveling direction and speed, a change in the direction, or a halt operation of the Segway-shaped leg type traveling apparatus 200 may be controlled based on a tilt of the embarkation body 210 occurring due to an action of the user.

Thus, the embarkation body 210 may further include the detection unit 260 to detect a degree of the tilt of the embarkation body 210, and a control unit 270 to selectively control an operation of the drive unit 280 based on detection information provided by the detection unit 260. The detection unit 260 performs the detecting and the control unit 270 controls the operation of the drive unit 280 to automatically control the Segway-shaped leg type traveling apparatus 200.

Referring to FIG. 12, the detection unit 260 includes a traveling direction tilt sensor 261 to detect a tilt in a front and rear direction of the embarkation body 210, and an orthogonal traveling direction tilt sensor 265 to detect a tilt in a left and right direction of the embarkation body 210.

For example, when the traveling direction tilt sensor 261 detects an overall forward tilt of the embarkation body 210, the control unit 270 may selectively control each drive motor of the drive unit 280 to perform normal rotation and thus, the Segway-shaped leg type traveling apparatus 200 may travel in a forward direction. Conversely, when the traveling direction tilt sensor 261 detects an overall backward tilt of the embarkation body 210, the control unit 270 may selectively control each drive motor of the drive unit 280 to perform counter rotation and thus, the Segway-shaped leg type traveling apparatus 200 may travel in a backward direction.

When the forward or the backward tilt, or a forward or backward tilt angle, detected by the traveling direction tilt sensor 261 is larger, the control unit 270 may increase a driving speed of the drive unit 280 to increase the traveling speed. Conversely, when the forward or the backward tilt is smaller, the control unit 270 may decrease the driving speed of the drive unit 280 to decrease the traveling speed.

For another example, when the orthogonal traveling direction tilt sensor 265 having a lateral direction against the traveling direction detects a leftward tilt of the embarkation body 210, the control unit 270 may selectively drive the drive motors 281 and 283 of the drive unit 280 to allow the Segway-shaped leg type traveling apparatus 200 to steer to a left direction. Conversely, when the orthogonal traveling direction tilt sensor 265 detects a rightward tilt of the embarkation body 210, the control unit 270 may selectively drive the drive motors 281 and 283 of the drive unit 280 to allow the Segway-shaped leg type traveling apparatus 200 to steer to a right direction.

In detail, the orthogonal traveling direction tilt sensor 265 may measure a leftward or a rightward tilt angle and deliver detection information obtained by the measuring to the control unit 270. The control unit 270 may then determine a leftward or a rightward rotating speed of each of the drive motors 281 and 283 based on the measured tilt angle. When the leftward or the rightward tilt angle is large, the control unit 270 may increase the leftward or the rightward rotating speed. Conversely, when the leftward or the rightward tilt angle is small, the control unit 270 may decrease the leftward or the rightward rotating speed.

As described in the foregoing, the control unit 270 may control the Segway-shaped leg type traveling apparatus 200 to maintain balance and readily travel in forward, backward, leftward, or rightward directions.

The foregoing description may be applicable to a principle of controlling the drive unit 280 by the control unit 270 based on the detection information provided by the detection unit 260 and thus, a repeated description will be omitted here for brevity.

The Segway-shaped leg type traveling apparatus 200 may readily travel despite an obstacle such as a flight of stairs because the leg type traveling unit 230 is provided in a type of a leg in lieu of a wheel structure. Further, the user may readily operate the Segway-shaped leg type traveling apparatus 200 when on board because the control unit 270 controls the drive unit 280 based on the detection information provided by the detection unit 260.

The configuration of the leg type traveling unit 230 is described in the foregoing, and examples of modifications to the leg type traveling unit 230 may be described with reference to FIGS. 6 and 7.

According to example embodiment of the present invention, there is provided a leg type traveling apparatus in which a travel module is provided in a type of a leg in lieu of a wheel structure to readily travel despite an obstacle such as flight of stairs.

According to example embodiment of the present invention, there is provided a leg type traveling apparatus in which a drive unit provides a travel module with driving power for rotation to reduce exhaustion of a physical strength of a rider and improve convenience.

According to example embodiment of the present invention, there is provided a leg type traveling apparatus in which a control unit controls a drive unit based on detection information provided by a detection unit to enable a rider to readily operate a Segway.

Although a few example embodiments of the present invention have been shown and described, the present invention is not limited to the described example embodiments. Instead, it would be appreciated by those skilled in the art that changes may be made to these example embodiments without departing from the principles and spirit of the invention, the scope of which is defined by the claims and their equivalents.

What is claimed is:

1. A bicycle-shaped traveling apparatus, comprising:
   a bicycle frame;
   a travel module comprising a front traveling unit rotatably mounted to a front of the bicycle frame and a rear traveling unit rotatably mounted to a rear of the bicycle frame;
   a drive unit to drive the travel module; and
   a control unit to control the drive unit, and
   wherein the control unit comprises:
   a pedal detector to detect a rotating speed of a pedal rotatably mounted to the bicycle frame; and
   a controller to control a driving speed of the drive unit based on detection information provided by the pedal detector, and
   wherein each of the front traveling unit and the rear traveling unit comprises:
   a shaft mounted to the bicycle frame;
   a leg unit rotatably connected to the shaft and comprising a plurality of leg members enabling travel by stepping on a ground and pushing off the ground during rotation; and
   a brake mounted to the shaft to halt the rotation of the leg unit.

2. The apparatus of claim 1, wherein the control unit further comprises:
   a lever detector to detect an operation of a brake lever mounted to the bicycle frame and deliver detection information obtained by the detecting to the controller, and
   wherein, when a rider pulls the brake lever, the controller activates the brake or halts an operation of the drive unit to halt an operation of the travel module.

3. The apparatus of claim 1, wherein the leg unit is provided as a pair of leg units separated along a longitudinal direction of the shaft, and the leg members of each of the leg units are disposed at equidistant intervals along a circular direction of the shaft.

4. The apparatus of claim 1, wherein each of the leg members comprises:
   an articular portion comprising a plurality of joints; and
   an elastic portion to connect the joints and allow one joint to be transformed with respect to another joint.

5. The apparatus of claim 4, wherein the leg member further comprises:
   a nonskid pad mounted to an end portion of the articular portion to prevent skidding when in contact with the ground.

6. The apparatus of claim 4, wherein the elastic portion is provided in a type of a spring or a torsion spring.

7. The apparatus of claim 2, wherein the drive unit is mounted to each of the pair of the leg units and comprises drive motors to be selectively driven under a control of the control unit.

* * * * *